United States Patent [19]

Bücker

[11] Patent Number: 5,632,227
[45] Date of Patent: May 27, 1997

[54] MILK-LINE VALVE

[75] Inventor: Heinrich Bücker, Langenberg, Germany

[73] Assignee: Westfalia Separator Aktiengesellschaft, Oelde, Germany

[21] Appl. No.: 428,465

[22] PCT Filed: Aug. 28, 1993

[86] PCT No.: PCT/EP93/02328

§ 371 Date: Apr. 25, 1995

§ 102(e) Date: Apr. 25, 1995

[87] PCT Pub. No.: WO94/12017

PCT Pub. Date: Jun. 9, 1994

[30] Foreign Application Priority Data

Dec. 2, 1992 [DE] Germany .................. 42 40 521.1

[51] Int. Cl.$^6$ ................................................. A01J 5/00
[52] U.S. Cl. ........................................ 119/14.01; 251/146
[58] Field of Search ................................ 119/14.01, 14.44; 251/146

[56] References Cited

U.S. PATENT DOCUMENTS

| 3,591,132 | 7/1971 | Johnston et al. ............ 251/146 |
| 3,870,348 | 3/1975 | Hawkins ................. 251/146 X |
| 5,445,357 | 8/1995 | Torgerson et al. ........ 119/14.01 X |

*Primary Examiner*—Robert R. Swiatek
*Attorney, Agent, or Firm*—Sprung Horn Kramer & Woods

[57] ABSTRACT

A milk line valve comprises a slide, a connector and a saddle. A port in the saddle opens into the milk line through an annular seal and the slide obstructs the seal. When the connector is inserted, it moves the slide into a position in which it unblocks the port and allows it to communicate with an opening in the connector. The slide and connector can be forced against the seal by connector guides and springs which force the guides against the seal with a prescribed force.

6 Claims, 2 Drawing Sheets

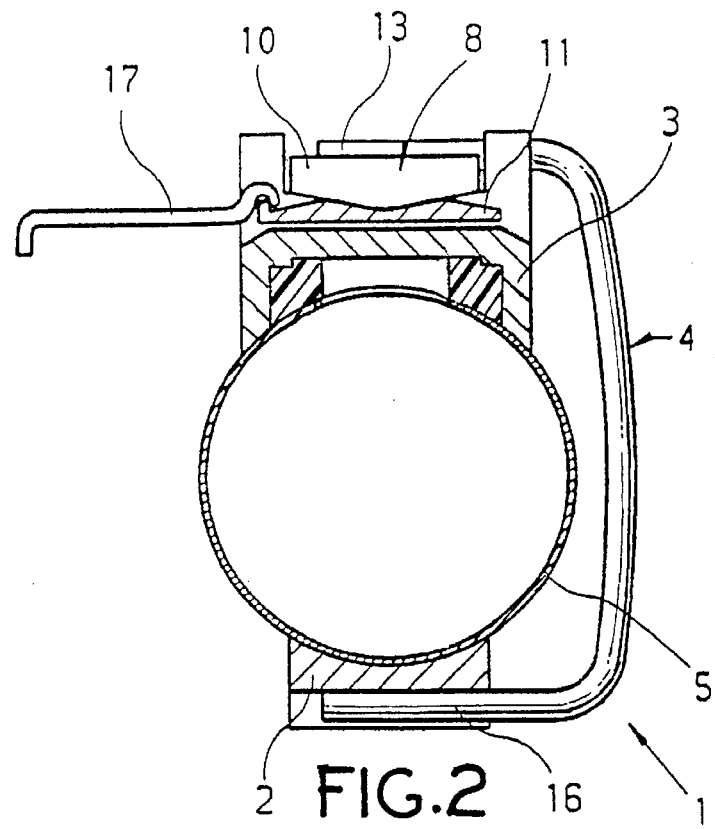
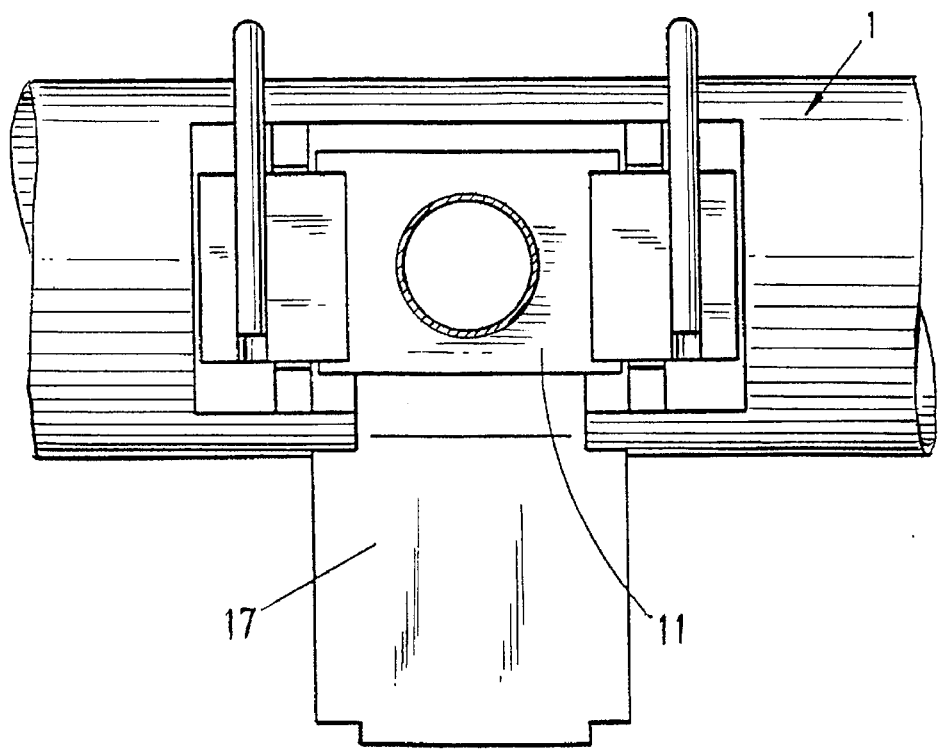

MILK-LINE VALVE

BACKGROUND OF THE INVENTION

The present invention concerns a milk-line valve. It comprises a slide, a connector, and a saddle. A port in the saddle opens into the milk line through an annular seal. The slide obstructs the seal. When the connector is inserted, it moves the slide into a position in which it unblocks the port and allows it to communicate with an opening in the connector. The slide and connector can be forced against the seal by connector guides.

A milk-line valve of this type is known from DE 4 003 367 A1 for example. It is used in the dairy industry to connect a milking machine to a milkline. The connector is introduced into the guides, forcing the slide out of its port-blocking position, until the opening in the connector coincides with the port in the saddle. The guides are rigid and specially shaped to force the saddle against the seal.

It is difficult to manufacture the parts precisely enough to attain precisely the prescribed force. Furthermore, the parts tend to eventually deform and the seal to wear out, affecting the level of force. These factors can make the seal too tight or too loose. The slide will no longer be able to move back and forth freely, and the seal can leak. The saddle in the known milk-line valve is screwed to the line. Such connections, however, take time to screw together and can eventually loosen and shift the saddle out of its proper position on the milk line.

SUMMARY OF THE INVENTION

The object of the present invention is accordingly a milk-line valve with a prescribed sealing force that is not affected by wear or by manufacturing imprecision and that will allow the slide to move back and forth freely.

This object is attained in accordance with the invention by springs that force the guides against the seal with a prescribed force. Since the guides rest resiliently instead of rigidly against the connector and slide, the strength of the seal is determined by the power of the springs and not by the shape of the slide. The effects of manufacturing imprecision will accordingly be negligible.

The springs in one practical embodiment of the present invention are U-shaped lengths of resilient wire. One arm of the U rests against the guides and the other against the side of the milk line that faces the guides. The springs accordingly not only generate a prescribed force on the guides but also secure the saddle in its proper position on the line. No screws are necessary. The saddle will be secured particularly well if the other arm of each spring rests in a groove in the outer surface of a holder that fits snugly around the milk line.

The guides in another practical embodiment rest against the saddle at one point of contact and against the connector at another point of contact and have a stop between the points of contact that the first arm of one spring rests against. The force exerted by the springs is accordingly distributed between the two points. How the force is distributed depends on the position of the stop. The force exerted on the milk line by the saddle can accordingly be essentially more powerful than that on the guides. The saddle will be reliably secured and the strength of the seal limited to the desired extent.

The positions of the stop and of the points of contact where the guides rest against the saddle and the connector in another and particularly practical embodiment of the invention can be varied to ensure that the force exerted on the connector is less powerful when the second point is farther from the milk line and more powerful when it is near. The result is automatic compensation for any slackening in the force of the springs due to wear, because a lot of the force will shift to the first point as the point becomes worn down.

The connector can be designed to raise and then lower the points of contact where the guides rest against it while it is being inserted. The force exerted against it will accordingly be less powerful while the connector is being inserted, and it will be much easier to insert. Once the connector is inserted, however, the points of contact will be lower, and the increased force will render the seal as strong as desired.

BRIEF DESCRIPTION OF THE DRAWINGS

Various embodiments of the invention will now be specified with reference to the drawing, wherein FIG. 2 is a section along the line II—II in FIG. 1, and FIG. 3 is a top view of the valve illustrated in FIG. 1.

DETAILED DESCRIPTION OF THE INVENTION

Figure 1:
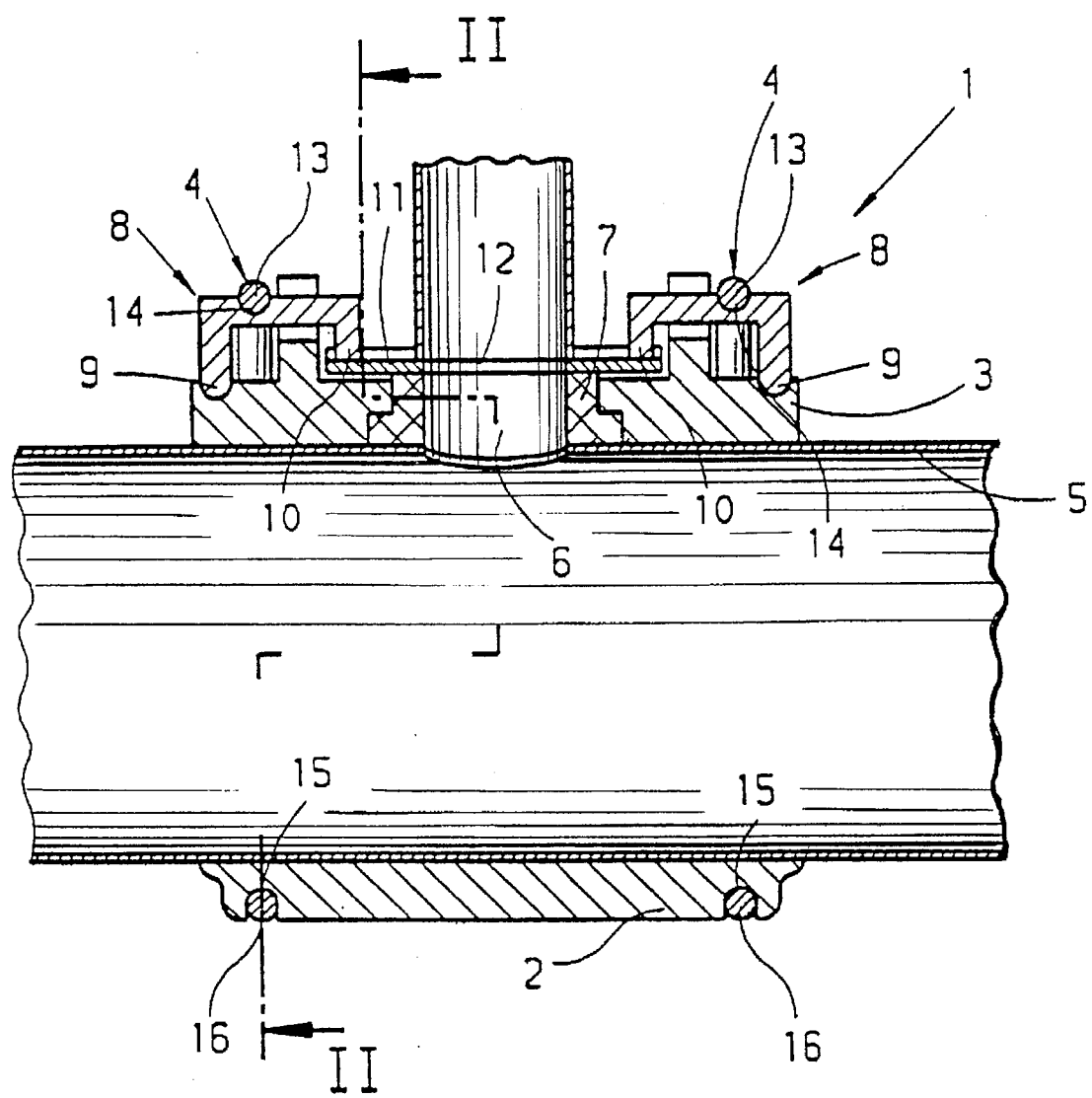
FIG. 1 is a section through a milk-line valve.

The valve 1 illustrated in FIG. 1 comprises a base 2 and a saddle 3 secured snugly around a milk line 5 by springs 4. Saddle 3 includes a port 6 that communicates with line 5 by way of an annular seal 7. Mounted on saddle 3 are guides 8. Guides 8 rest against the saddle at a first point 9 of contact and against a connector 11 at another point 10 of contact, forcing the connector against seal 7. Connector 11 includes an opening 12. When connector 11 is in its final position, opening 12 will coincide with port 6. Springs 4 consist of U-shaped lengths of resilient wire. One arm 13 of each U rests in a stop 14. Stops 14 are located on the top of guides 8 between first point 9 of contact and second point 10 of contact. The second arm 16 of the U engages a groove 15 in base 2.

The shape of each spring 4 and that of connector 11 in the vicinity of second point 10 of contact will be evident from FIG. 2. How the point is lifted as the connector is inserted into saddle 3 will also be apparent. While connector 11 is in the illustrated position, it is coupled to a thruster 17. As connector 11 is extracted from saddle 3, thruster 17 is drawn over seal 7, closing off the port 6 in saddle 3. Only then can connector 11 be uncoupled from thruster 17. The first arm 13 of each spring 4 rests against a guide 8 and second arm 16 rests against base 2, forcing valve 1 against line 5 and sealing connector 11 tight.

FIG. 3 illustrates valve 1 with connector 11 inserted and thruster 17 open.

Second points 10 of contact lift as connector 11 is inserted. The forces exerted on guides 8 by springs 4 shift, due to the shape of guides 8 as illustrated in FIG. 1, toward first points 9 of contact, while the forces exerted by second points 10 of contact against connector 11 decrease, facilitating insertion of the connector. Second points 10 of contact subside again as connector 11 is inserted all the way in, and the forces exerted on them shift, increasing the force exerted by the connector against seal 7. Even when seal 7 becomes worn, the resulting decrease in resilience will be compensated for by its increased displacement toward second points 10 of contact.

I claim:

1. A milk line valve comprising a slide, a connector, and a saddle, wherein a port in the saddle opens into the milk line through an annular seal and the slide obstructs the seal, wherein when the connector is inserted, it moves the slide into a position in which it unblocks the port and allows it to communicate with an opening in the connector, and wherein the slide and connector can be forced against the seal by connector guides and by springs that force the guides against the seal with a prescribed force.

2. The valve as in claim 1, wherein the springs are U-shaped lengths of resilient wire with one arm of the U resting against the guides and the other arm against the side of the milk line that faces the guides.

3. The valve as in claim 2, wherein the outer arm of each spring rests in a groove in the outer surface of a holder that fits snugly around the milk line.

4. The valve as in claim 2, wherein the guides rest against the saddle at one point of contact and against the connector at another point of contact and have a stop between the points of contact that the one arm of one spring rests against.

5. The valve as in claim 4, wherein the positions of the stop and of the points of contact where the guides rest against the saddle and the connector can be varied to ensure that the force exerted on the connector is less powerful when the second point is farther from the milk line and more powerful when it is near.

6. The valve as in claim 5, wherein the connector is designed to raise and then lower the points of contact where the guides rest against it while it is being inserted.

* * * * *